(12) United States Patent
Shimazaki et al.

(10) Patent No.: US 7,637,528 B2
(45) Date of Patent: Dec. 29, 2009

(54) AIRBAG DEVICE

(75) Inventors: Yoshio Shimazaki, Settsu (JP); Seiichiro Kamura, Settsu (JP); Kou Sasaki, Settsu (JP)

(73) Assignee: Ashimori Industry Co., Ltd., Osaka (JP)

( * ) Notice: Subject to any disclaimer, the term of this patent is extended or adjusted under 35 U.S.C. 154(b) by 0 days.

(21) Appl. No.: 11/995,992

(22) PCT Filed: May 10, 2006

(86) PCT No.: PCT/JP2006/309382

§ 371 (c)(1), (2), (4) Date: Jan. 17, 2008

(87) PCT Pub. No.: WO2007/010662

PCT Pub. Date: Jan. 25, 2007

(65) Prior Publication Data

US 2009/0091107 A1    Apr. 9, 2009

(30) Foreign Application Priority Data

Jul. 20, 2005    (JP) .............................. 2005-210373

(51) Int. Cl.
  *B60R 21/215* (2006.01)
(52) U.S. Cl. ................................. 280/728.2
(58) Field of Classification Search ............. 280/728.3, 280/731, 743.1, 743.2, 728.2; 200/61.54, 200/61.55, 61.56, 61.57
See application file for complete search history.

(56) References Cited

U.S. PATENT DOCUMENTS

| 3,618,979 | A | 11/1971 | Gulette |
| 6,042,147 | A | 3/2000 | Nishijima et al. |
| 6,536,801 | B2 | 3/2003 | Frisch |
| 6,550,804 | B2 * | 4/2003 | Burdock ..................... 280/731 |
| 6,561,538 | B2 * | 5/2003 | Ford et al. ............... 280/728.2 |
| 6,695,344 | B2 * | 2/2004 | Hauer ........................ 280/731 |
| 6,739,620 | B2 | 5/2004 | Derrick |
| 7,357,409 | B2 * | 4/2008 | Frisch .................... 280/728.3 |
| 2002/0130493 | A1 | 9/2002 | Ford et al. |

(Continued)

FOREIGN PATENT DOCUMENTS

| JP | 10-114253 A | 5/1998 |
| JP | 2002-362276 A | 2/2002 |
| WO | 98/14353 A1 | 4/1998 |

*Primary Examiner*—Paul N Dickson
*Assistant Examiner*—Robert A Coker
(74) *Attorney, Agent, or Firm*—Sughrue Mion, PLLC

(57) ABSTRACT

There is provided an airbag device comprising electrical equipment disposed at the central part of a steering wheel, capable of connecting a harness to the electrical equipment while using the steering shaft, the inflator, and so forth, commonly in use, thereby alleviating work for manufacturing intricate components, and achieving reduction in component cost. The airbag device comprises an airbag cover (16) for housing an airbag (10) folded substantially at the central part of a steering wheel (50R), and electrical equipment (M) disposed at a recessed part (16a) of the airbag cover (16), wherein a backside of the recessed part (16a) of the airbag cover (16) is covered with a fixed end portion of a tubular tether belt (11a) for constraining a distance up to which the airbag undergoes inflation and expansion, and a harness (26) is inserted into a harness insertion hole (11ah') provided at the fixed end portion, the harness being connected to an electrode member of the electrical equipment (M).

6 Claims, 7 Drawing Sheets

U.S. PATENT DOCUMENTS

2002/0135143 A1 9/2002 Deetz
2003/0067148 A1 4/2003 Keutz
2005/0146119 A1* 7/2005 Ford et al. .................. 280/731
2005/0184486 A1* 8/2005 Schneider et al. ........ 280/728.2

* cited by examiner

Prior Art

Prior Art

_US 7,637,528 B2_

AIRBAG DEVICE

TECHNICAL FIELD

The invention relates to an airbag device for use in an automobile, and in particular, to an airbag device provided with an attachment structure for attaching a harness of electrical equipment such as a horn unit and so forth to the airbag device.

BACKGROUND TECHNOLOGY

There has been known an airbag device disposed at the central part of a steering wheel of an automobile, having a display device, a multifunction switching device, or a horn switching device, equipped with an airbag cover for housing an airbag on the outside of those switches and so forth.

An airbag device GB shown in FIG. 7 by way of example is provided with a display device 6R installed at the central part of a steering wheel 50R, an airbag cover 21R for containing an airbag provided with tear lines 30R to be ruptured by a gas pressure of an inflator, disposed outside of the display device 6R, and a multifunction switching device 40R for changing over a display screen of the display device 6R, disposed on the right side of the airbag cover 21R.

FIG. 8 is a cross-sectional view of the airbag device GB shown in FIG. 7, showing a state in which the airbag device GB is inflated and expanded due to an impact imposed thereon, by a vehicle and so forth.

As shown in FIG. 8, a gas generator 60R provided with the inflator is disposed at the central part of the steering wheel 50R, a securing member 4R for securing an airbag is disposed above the gas generator 60R in the figure, and a steering shaft of an operating unit is disposed below the gas generator 60R in the figure.

An angle sensor 44R of the steering wheel 50R is provided on the steering shaft and a controller 42R receiving a signal from the angle sensor 44R transmits display information corresponding to the signal to the display device 6R, which is in contact with, and secured to the head of the securing member 4R, via a harness inserted through respective holes defined in the steering shaft, the inflator, and the securing member 4R. Reference numerals 22R, 22Ra denote an airbag and a tubular tether belt, respectively, and the airbag and the tubular tether belt are normally folded and housed in the airbag cover 21R.

In the case of the conventional airbag device GB having the display device, electrical equipment such as the multifunction switching device or the horn switching device, disposed substantially at the central part of the steering wheel, and the airbag cover disposed outside those devices, the hole for use in insertion of the harness need to be made in the steering shaft, the inflator and so forth, respectively, and therefore, a steering shaft, an inflator and so forth, commonly used in the past, cannot be adopted in this case. In consequence, there arise needs for a steering shaft, inflator and so forth, provided with a hole for exclusive use in the airbag device GB respectively, so that work for manufacturing those components becomes complex, resulting in an increase in component cost.

Patent Document 1: U.S. Pat. No. 6,739,620 B2, Specification

DISCLOSURE OF THE INVENTION

Problems to be Solved by the Invention

The invention has been developed in order to solve problems with the conventional technology described as above, and it is an object of the invention to provide an airbag device comprising electrical equipment disposed at the central part of a steering wheel, capable of connecting a harness to the electrical equipment while using the steering shaft, the inflator and so forth, commonly in use, thereby alleviating work for manufacturing intricate components, and achieving reduction in component cost.

Means for Solving the Problem

To that end, the invention disclosed in Claim 1 is an airbag device comprising an airbag cover for housing an airbag folded substantially at the central part of a steering wheel, and electrical equipment disposed at a recessed part of the airbag cover, characterized in that a backside of the recessed part of the airbag cover is covered with a fixed end portion of a tubular tether belt for constraining a distance up to which the airbag undergoes inflation and expansion, and a harness or terminal connectable thereto is inserted into a harness hole provided in the recessed part and a harness insertion hole provided at the fixed end portion, the harness or the terminal connectable thereto being connected to an electrode member of the electrical equipment.

The invention includes the foregoing airbag device characterized in that the electrical equipment is a horn switching device, and is fixed substantially at the same position with an attachment bolt reversed in polarity from the harness even after expansion of the airbag.

The invention includes the foregoing airbag device characterized in that the horn switching device comprises a horn base inserted in the recessed part of the airbag cover, a slidable member at the front side facing to the occupant side, a butting member movable against the action of an energizing means by pressing down the slidable member, and a contact plate clamped in the horn base by the energizing means, directly or indirectly connected to the harness, and electrically connectable to the energizing means and the butting member, both electrodes being short-circuited by butting the butting member against the attachment bolt directly or indirectly thereby sounding a horn.

The invention includes the foregoing airbag device according to claim 3 characterized in that the contact plate is provided with the terminal connected to the harness inserted through the harness hole and the harness insertion hole.

The invention includes the foregoing airbag device characterized in that the contact plate is provided with the terminal and retaining juts provided on both adjacent sides of the terminal at one side on an outer circumference thereof, and a rotation preventive jut at the other side symmetrical with respect to the center thereof, while the horn base has stoppers for stopping the retaining juts, respectively, and a notched groove for engaging the rotation preventive jut.

The invention includes the foregoing airbag device characterized in that the contact plate is fitted between a fitting part erected along an inner circumference thereof, on the horn base, and a rotation stopper erected along an outer circumference thereof, on the horn base.

EFFECT OF THE INVENTION

Thus, connection with the contact plate disposed in the horn switching device can be easily made by forming the harness insertion hole for insertion of the harness in the tubular tether belt, thus it becomes possible to eliminate the needs for a steering shaft, inflator and so forth, provided with a hole for exclusive use in the airbag device, respectively, so that an airbag device and so forth commonly used in the past, can be utilized. Accordingly, work for manufacturing intricate components, as required in the past, is no longer required, resulting in reduction in component cost.

A makeup whereby the harness is connected to the electrical equipment is applicable to various devices such as a display device, a multifunction switching device, and a horn switching device and so forth, and is therefore high in flexibility. Further, it need only be sufficient to provide the horn base, and the recessed part of the airbag cover with the harness hole for insertion of the harness, and there is no need for a steering shaft, an inflator and so forth, each with a hole bored as in the past, resulting in enhanced efficiency of work for manufacturing components.

Further, the contact plate is provided with the terminal at one of sites on an outer circumference thereof, symmetrical with respect to the center thereof, with the retaining jut provided on both sides of the terminal, and the rotation preventive jut at the other site while the horn base has the stoppers for stopping the retaining juts, respectively, and the notched groove for engaging the rotation preventive jut, so that it is possible to prevent the contact plate terminal from being moved and rotated when connecting the harness terminal to the contact plate terminal, thereby achieving enhancement in such connection work as described.

EXPLANATION OF THE REFERENCE NUMERALS

1 . . . horn base, 1c . . . harness hole, 1f . . . stoppers, 1g . . . notched groove, 2 . . . spring, 3 . . . spring plate, 4 . . . attachment bolt, 6 . . . decorative member, 7 . . . horn ring, 8 . . . contact plate, 8' . . . terminal of contact plate, 8b . . . retaining juts, 8c . . . rotation preventive jut, 16 . . . airbag cover, 10 . . . airbag, 30 . . . inflator, 25 . . . harness terminal, 26 . . . harness

BEST MODE FOR CARRYING OUT THE INVENTION

Figure 1:
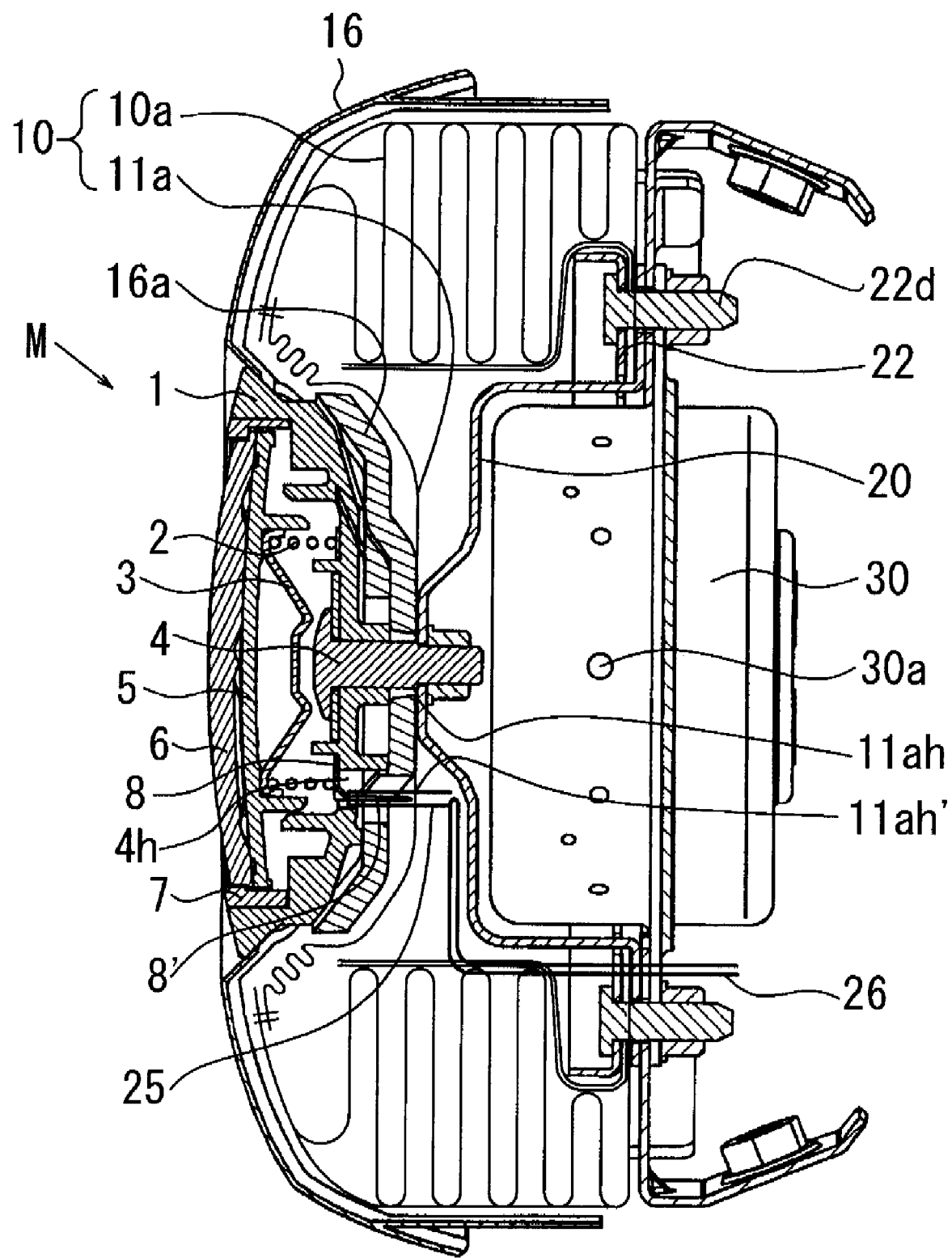
FIG. 1 is a cross sectional view of an airbag device with a horn switch attached thereto.

There is described hereinafter an embodiment of an airbag device for a driver's seat, according to the invention, with reference to the accompanying drawings. FIG. 1 is a cross sectional view of an airbag device with a horn switch attached thereto, showing a state in which the airbag device is fitted into an airbag cover. For convenience's sake, a side of an occupant is referred to as a front side while a side thereof opposite from the front side is referred to as a back side in the present specification.

Referring to FIG. 1, there is described a horn switching device M of the airbag device with the horn switch attached thereto.

The horn switching device M comprises a coil spring 2 placed at the center of the bottom of a bowl-shaped cylindrical horn base 1, a spring plate 3 (serving as one of electrodes of the horn switching device) for holding the coil spring 2 on its periphery, a sheet 5 of a decorative member 6 placed over the spring plate 3 for retaining the coil spring 2, the decorative member 6 placed over the sheet 5 so as to cover the same, and a horn ring 7 cylindrical in shape in which the sheet 5 and the decorative member 6 are slidably fitted. In this connection, slidable members comprising the decorative member 6 and the sheet 5 of the decorative member 6 for retaining the coil spring 2, may be formed into a single member by adopting a makeup whereby the coil spring 2 is retained by the decorative member 6.

The horn ring 7 is secured to the bowl-shaped cylindrical horn base 1, which is housed in a recessed part 16a at the center of an airbag cover 16 for housing an airbag therein, and is fixedly attached to a connecting member 20, which will be described later, with an attachment bolt 4 inserted in an attachment hole of the recessed part 16a, serving as the other of the electrodes of the horn switching device, and the head of the attachment bolt 4 is disposed at a position opposite to the spring plate 3.

Accordingly, if the decorative member 6 is pressed down, this will cause the spring plate 3 to be butted against the attachment bolt 4, whereupon short circuit occurs between both the electrodes, and current is supplied to the horn switching device M, thereby sounding a horn.

Now, in order to enable such a horn-switching operation as described to be executed, a contact plate 8 is clamped between the back side of the head of the attachment bolt 4 and the horn base 1, and a terminal 8' of the contact plate 8 is inserted into respective harness holes of the horn base 1 and the airbag cover 16 so as to be protruded from the airbag cover 16 to be thereby connected to a harness terminal 25 via a harness 26 inserted in a harness insertion hole 11ah' formed at a fixed end portion of a tubular tether belt 11a (for the purpose of constraining a distance up to which the airbag 10 undergoes inflation and expansion) covering a back side of the recessed part 16a of the airbag cover 16, as shown in FIG. 1, to be thereby connected to the horn switching device M.

Further, an attachment hole 11ah of the tubular tether belt 11a, for allowing the attachment bolt 4 to be inserted therethrough, is provided at the fixed end portion of the tubular tether belt 11a, and the fixed end portion covers the recessed part 16a of the airbag cover 16 from the back side thereof in such a way as to wrap up the recessed part 16a. The fixed end portion is clamped between the recessed part 16a of the airbag cover 16 and the connecting member 20 to be thereby fixed to the airbag device.

Figure 2:
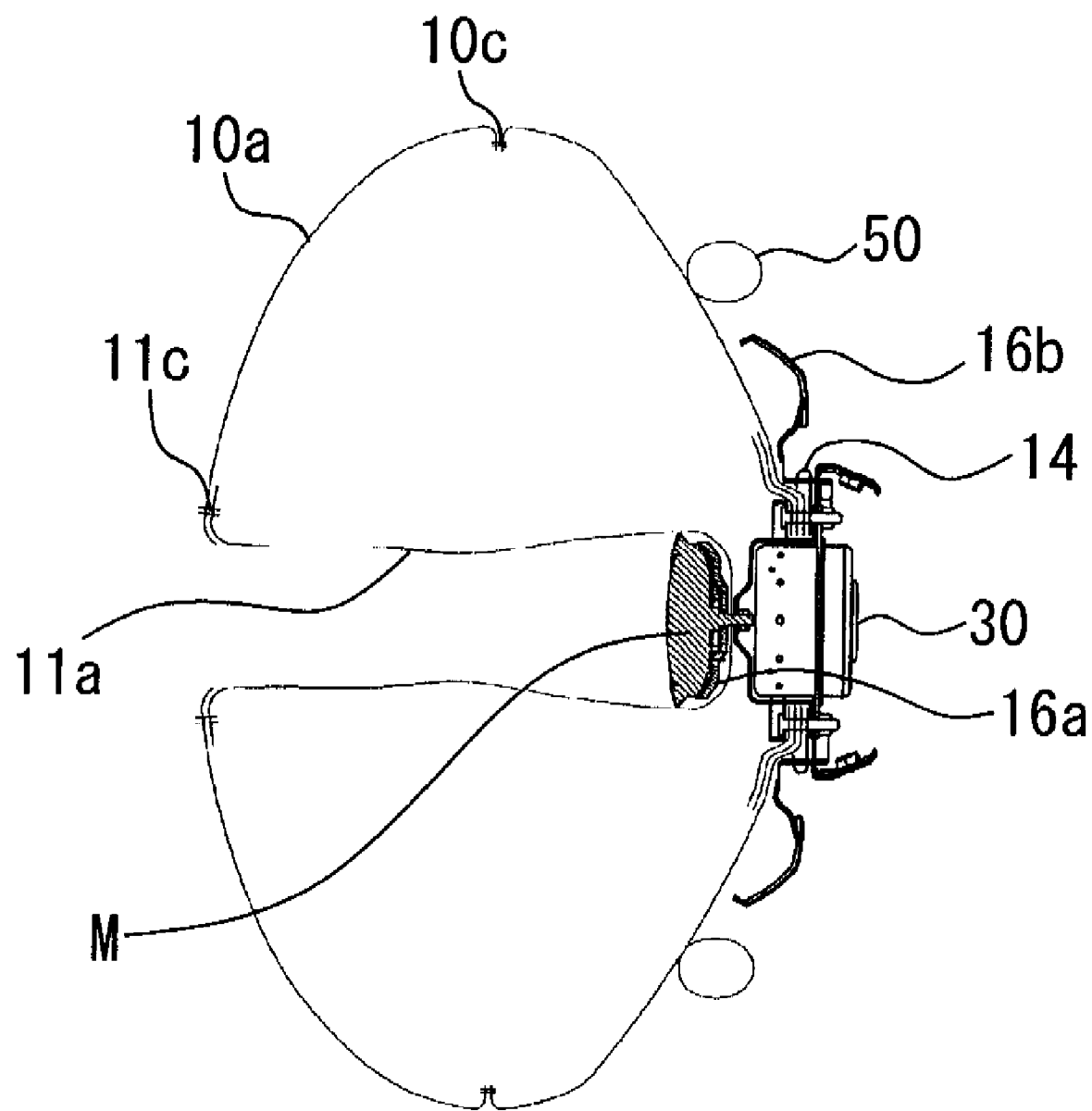
FIG. 2 is a view showing a state of an airbag undergoing inflation and expansion upon occurrence of a vehicle collision.
Figure 3:
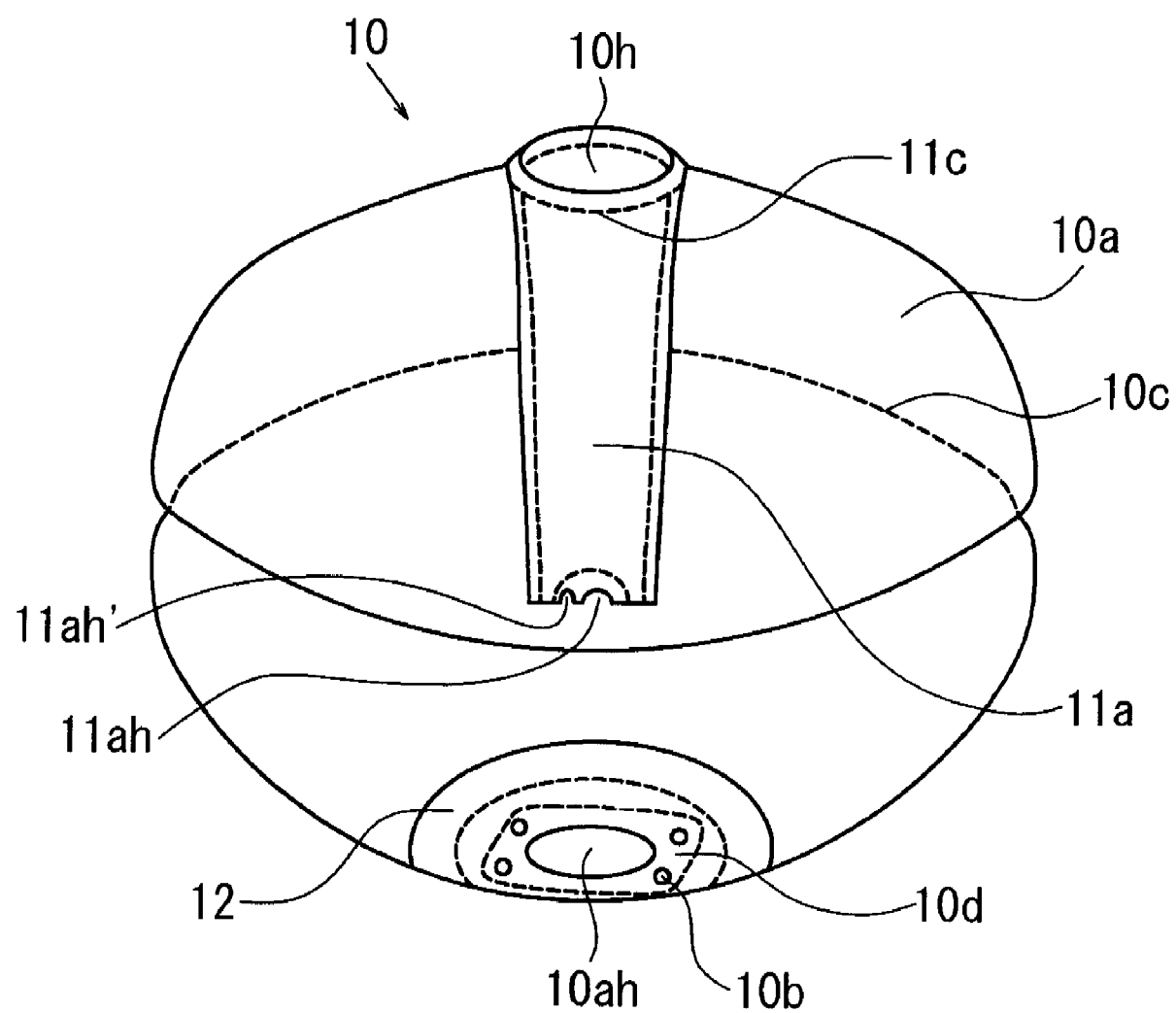
FIG. 3 is a see-through perspective view showing the interior of the inflated airbag, shown in FIG. 2.

Next, there is described hereinafter a makeup of the airbag device. As shown in FIGS. 2 and 3, the airbag 10 is made up of an airbag body 10a and the tubular tether belt 11a.

FIG. 2 is a view showing a state of the airbag 10 undergoing inflation and expansion upon occurrence of a vehicle collision and so forth. Ignition starts in an inflator 30 upon detection of an impact due to vehicle collision and so forth, whereupon gas is generated in the inflator 30 to thereby cause the gas to be introduced into the airbag 10. When the airbag 10 starts inflation, the airbag cover 16 is subjected to a force of the inflation and is split along tear-lines formed on the inner side of the airbag cover 16 in order to facilitate rupture thereof, that is, it is split while the recessed part 16a is left as it is, whereupon respective cover pieces 16b will radially expand.

Upon the gas being introduced into the airbag 10, in the initial stage in which the airbag 10 starts inflating after the airbag cover 16 is split, a surface portion of the airbag 10 undergoes inflation up to a distance constrained by the tubular tether belt 11a toward the front side (occupant side) while undergoing inflation and expansion by starting from a stitched part 11c where the central part of a base fabric of the airbag 10 is stitched to the tubular tether belt 11a, the tubular tether belt 11a enveloping the recessed part 16a. After the airbag 10 has inflated to a degree, the position of the stitched part 10c shifts substantially to the center along the center line of the tubular tether belt 11a, whereupon the airbag 10 is turned into a flat spherical shape, as shown in FIG. 2, thereby completing the inflation and expansion.

FIG. 3 is a see-through perspective view showing the interior of the inflated airbag 10, shown in FIG. 2. For brevity, the decorative member 6 incorporated inside the tubular tether belt 11a, the inflator 30 joined with the decorative member 6 and so forth are not shown in the figure. The airbag body 10a is formed in the shape of a bag that is expandable into a flat spherical shape (an ellipsoidal shape) by joining respective outer circumferential edges of two pieces of cloth substantially circular in shape with each other by stitching.

A notched part 10h circular in shape for insertion of the recessed part 16a of the airbag cover 16 is formed substantially at the center of the airbag body 10a on the front side thereof, and an inflator attachment opening 10ah associating with the inflator for introducing a generated gas into the airbag, is formed substantially at the center of the airbag body 10a on the back side thereof, while four small holes 10b for insertion of respective bolts 22d of a cushion ring 22 (see FIG. 1) are made in a peripheral part 10d around the inflator attachment opening 10ah.

As previously described, the attachment hole 11ah of the tubular tether belt 11a and the harness insertion hole 11ah' are formed at the fixed end portion of the tubular tether belt 11a, and as shown in FIG. 1, the attachment bolt 4 and the harness terminal 25 are inserted through the holes 11ah, 11ah', respectively.

The airbag 10 is folded by a folding device (not shown) for exclusive use in folding the airbag 10 in an accordion-like manner as shown in FIG. 1, and is doughnut-shaped in plan view.

Figure 4:
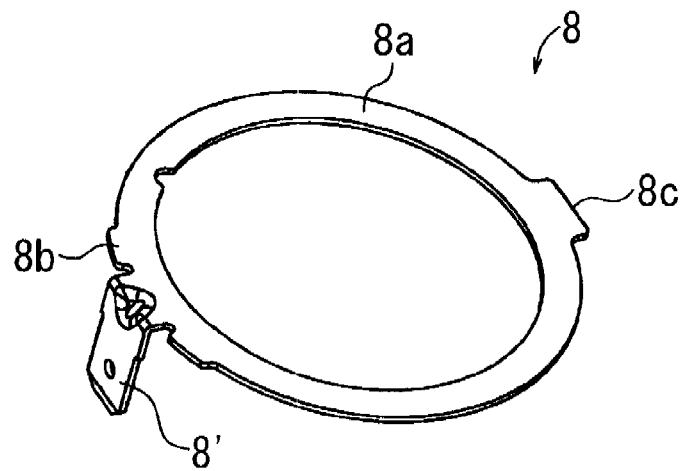
FIG. 4 is a perspective view of a contact plate.

Subsequently, there is described hereinafter the contact plate 8 with reference to a perspective view thereof, shown in FIG. 4. The contact plate 8 is fabricated by applying press working to an electrically conductive metal plate to thereby punch out a metal sheet in the shape of a ring with a rectangular portion formed on the outer periphery thereof, and by bending the rectangular portion substantially at right angles from a ring-shaped portion (the ring-shaped portion is referred to as a ring contact plate 8a), thereby forming the terminal 8' of the contact plate 8. A rotation preventive jut 8c is formed on a side of the ring contact plate 8a diametrically opposite from the terminal 8', and the rotation preventive jut 8c is provided in order to prevent the contact plate 8 after placed on the horn base 1 from being rotated.

Further, a pair of retaining juts 8b identical in shape to each other, having a width about half as large as the width of the rotation preventive jut 8c, are formed on respective sides of the contact plate terminal 8', adjoining thereto, on the ring contact plate 8a. The retaining juts 8b are stoppers for preventing the contact plate terminal 8' from being pushed and moved by the harness terminal 25 when the harness terminal 25 is connected to the contact plate terminal 8'. A distance between the retaining juts 8b in pairs is the same as a distance between stoppers 1f in pairs, which will be described later, such that the retaining juts 8b can be engaged with the stoppers 1f, respectively.

Figure 5:
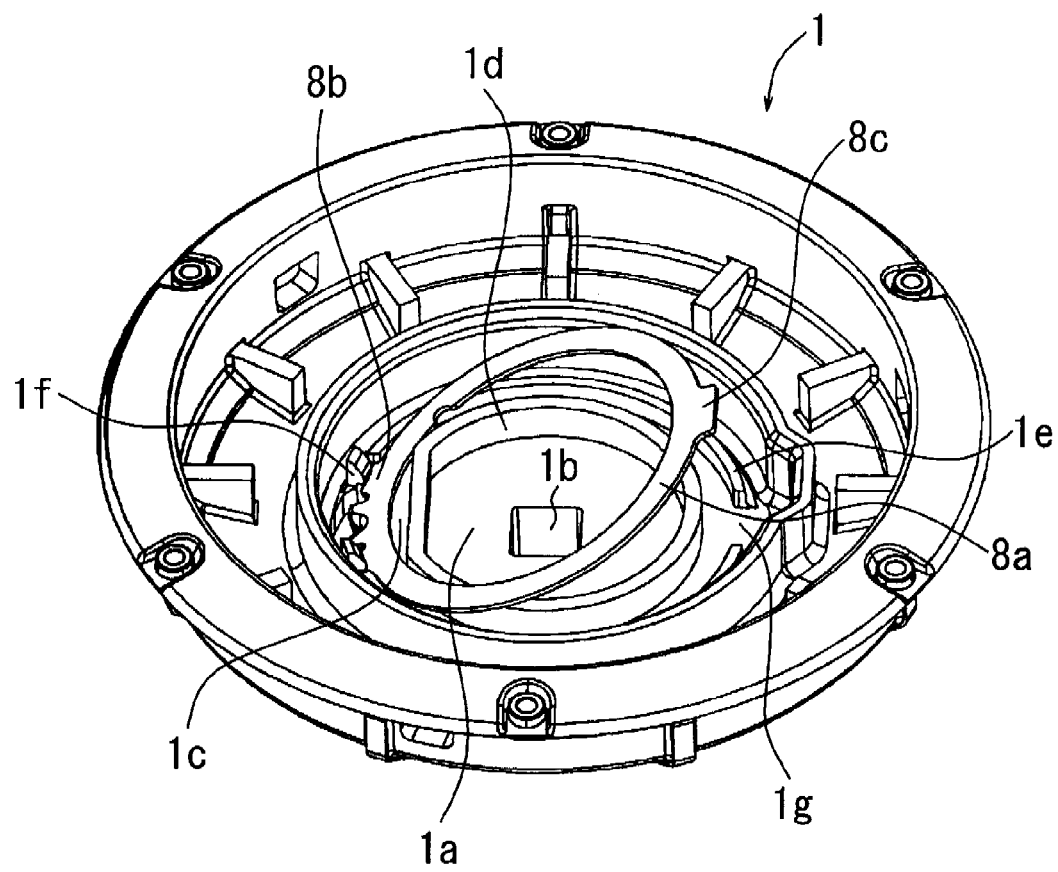
FIG. 5 is a perspective view of a bowl-shaped cylindrical horn base.

FIG. 5 is a perspective view showing the bowl-shaped cylindrical horn base 1 in FIG. 1, as diagonally seen. The horn base 1 is made of a synthetic resin, and a hole 1b substantially square in shape for insertion of the attachment bolt 4, and a harness hole 1c for use in insertion of the harness terminal 25 are formed at the center of the bottom 1a thereof. A fitting part 1d substantially columnar in shape, inserted through the inner periphery of the ring contact plate 8a, in such a way as to be concentrical with the center of the hole 1b, to be fitted thereinto, is erected from the bottom 1a.

When the ring contact plate 8a is fitted onto the fitting part 1d, in order to determine a fitting position thereof, a rotation stopper 1e columnar in shape, substantially identical in diameter to the outer periphery of the ring contact plate 8a, having a notched groove 1g substantially identical in width to the rotation preventive jut 8c, is erected from the bottom 1a of the horn base 1. At a position where the rotation stopper 1e intersects the harness hole 1c, there are formed the stoppers 1f in pairs, each extended in the shape of a square cylinder from the inner peripheral sidewall of the harness hole 1c, having a key-shaped head.

Next, there is described hereinafter a procedure for engaging the contact plate 8 with the horn base 1 with reference to FIGS. 5 and 6.

Figure 6:
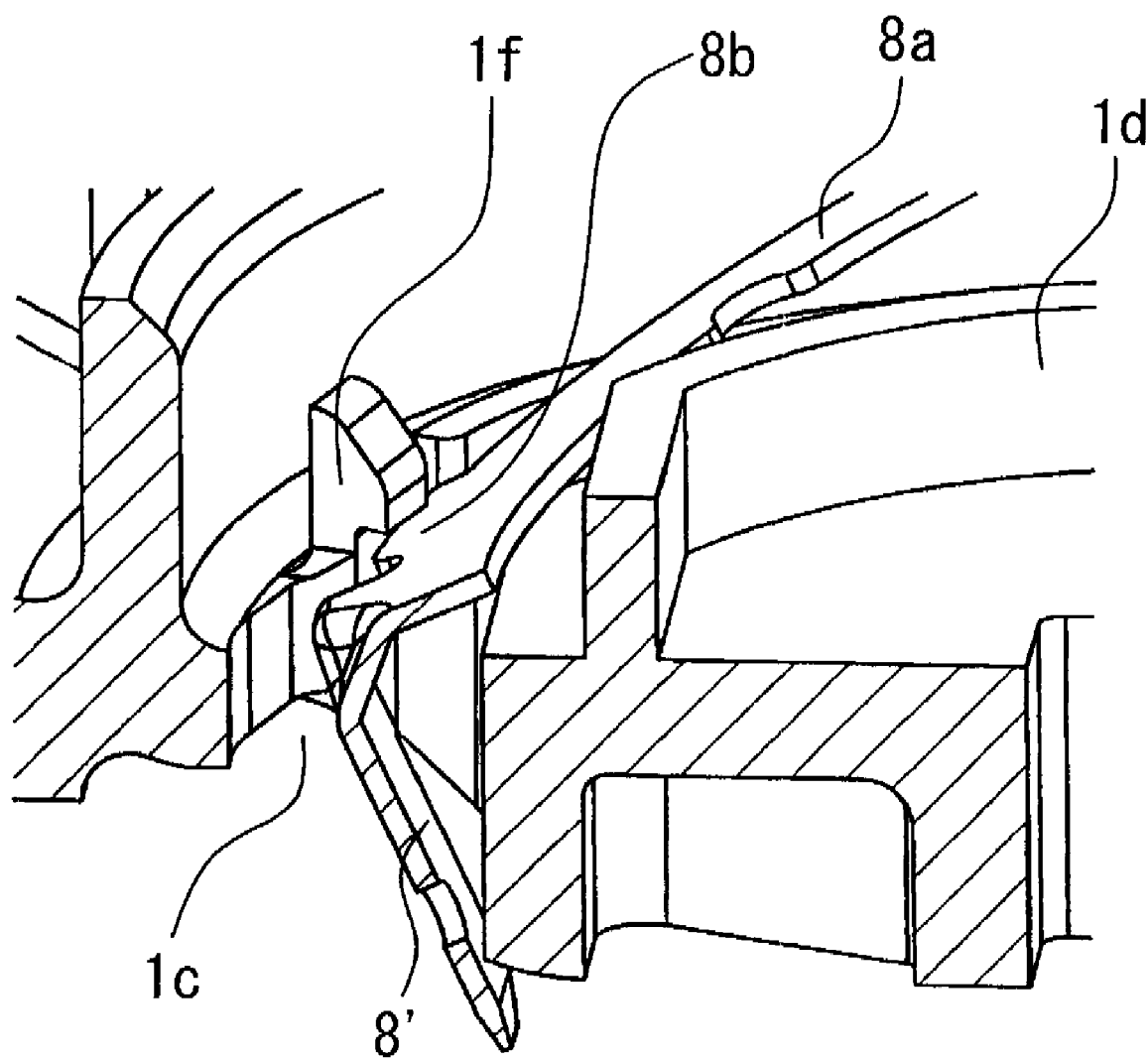
FIG. 6 is an enlarged longitudinal sectional view of the horn base shown in FIG. 5.
Figure 7:
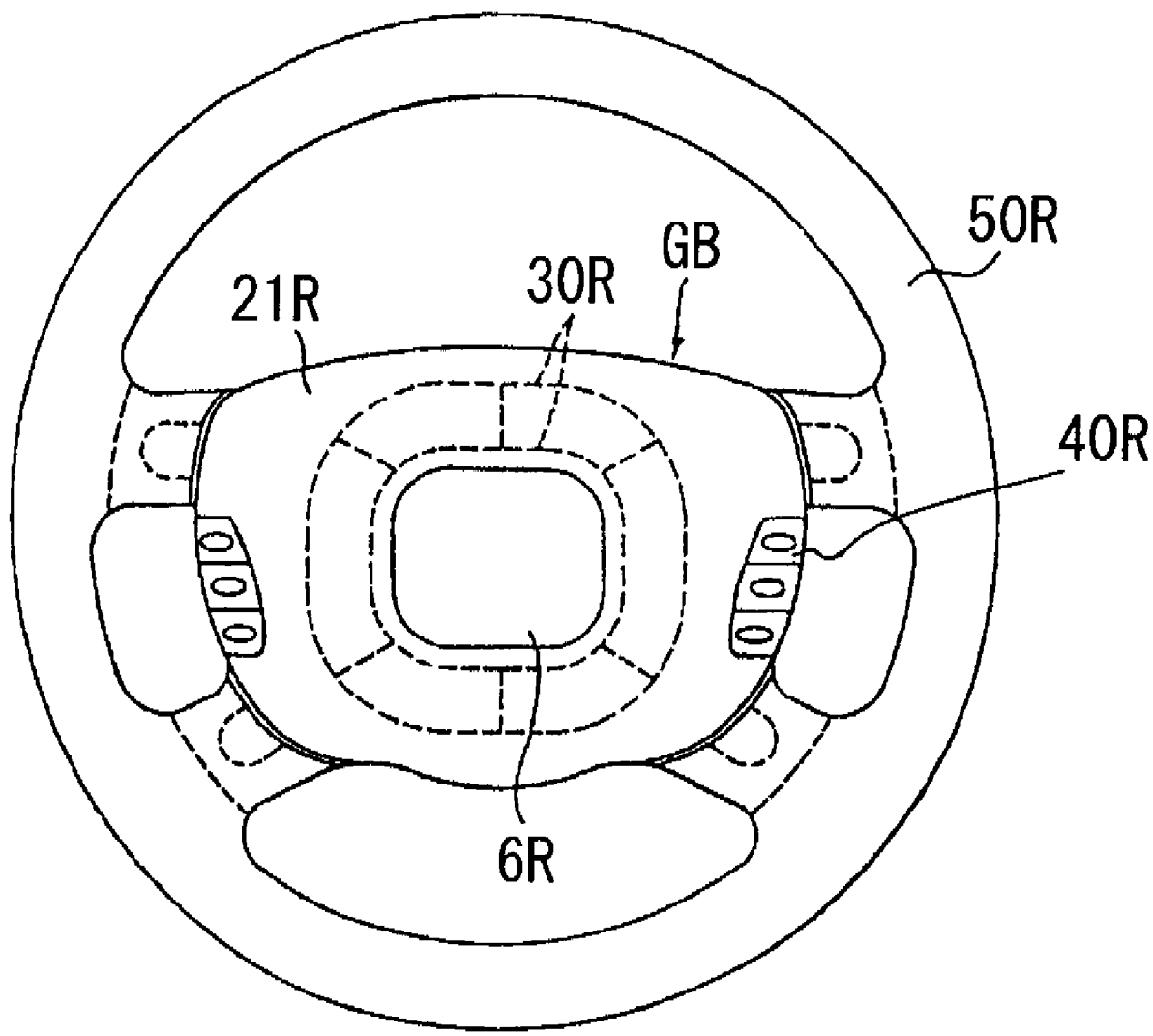
FIG. 7 is a plan view of a conventional airbag device.
Figure 8:
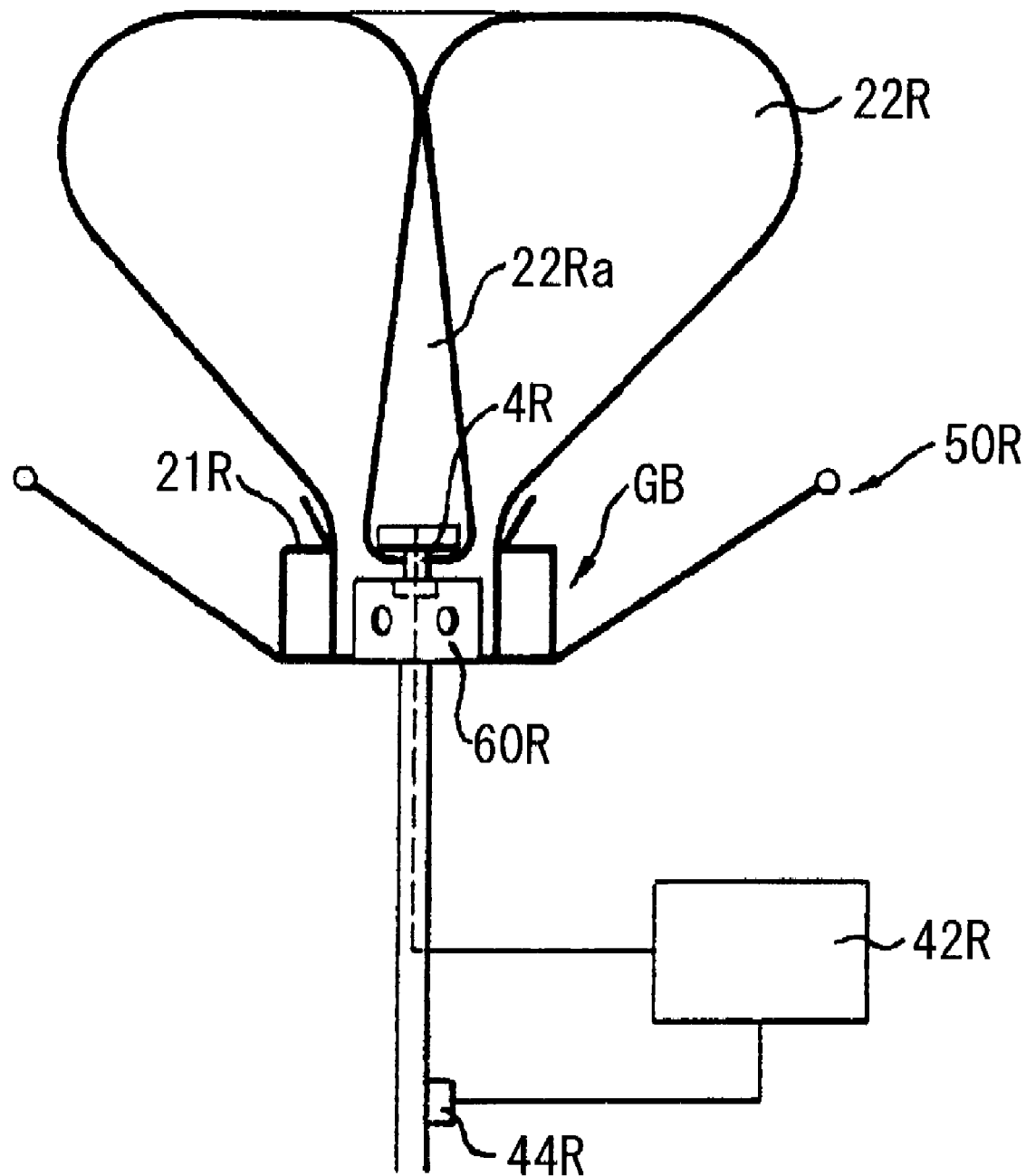
FIG. 8 is a cross-sectional view of the airbag device shown in FIG. 7, showing a state in which the airbag device is inflated and expanded due to an impact imposed thereon, by a vehicle and so forth.

FIG. 6 is an enlarged longitudinal sectional view of the horn base 1, shown in FIG. 5. As shown in FIG. 6, by butting the retaining juts 8b in pairs against the stoppers 1f in pairs, respectively, from a diagonal direction, the ring contact plate 8a is fitted onto the fitting part 1d to thereby insert the rotation preventive jut 8c into the notched groove 1g of the rotation stopper 1e.

Thus, the terminal 8' of the contact plate 8 fitted onto the fitting part 1d is disposed in the harness hole 1c, so that even if the terminal 8' is connected to the harness terminal 25 inserted in the harness insertion hole 11ah' at the fixed end portion of the tubular tether belt 11a, from below in the figure, and is pushed from a downward direction, the terminal 8' does not move because the retaining juts 8b in pairs are engaged with the stoppers 1f in pairs, respectively. Even if the harness terminal 25 is pushed from a diagonally downward direction to thereby cause a rotatably reciprocating force to act on the contact plate 8, the contact plate 8 will not rotatably reciprocates because the rotation preventive jut 8c is inserted in the notched groove 1g of the rotation stopper 1e, as shown in FIG. 5.

As described in the foregoing, with a conventional airbag device in common use, by forming the harness insertion hole 11ah' for insertion of the harness 26 (see FIG. 1) in the tubular tether belt 11a, connection with the contact plate 8 disposed in the horn switching device M can be easily made, so that it becomes possible to eliminate the needs for a steering shaft, an inflator and so forth provided with a hole for exclusive use in the airbag device, respectively, and work for manufacturing those components is no longer required, resulting in reduction in component cost.

A makeup for connecting the harness 26 to the electrical equipment, according to the embodiment, is applicable to various devices such as the display device 6R, the multifunction switching device 40R, and the horn switching device M and so forth, and is therefore high in flexibility. Further, it need only be sufficient to provide the horn base 1 and the recessed part 16a of the airbag cover 16 with the harness hole for insertion of the harness 26, and there is no need for a steering shaft, an inflator and so forth each with a hole bored as in the past, resulting in enhanced efficiency of work for manufacturing components.

Furthermore, the contact plate 8 has the terminal 8' at one of sides on an outer circumference thereof, symmetrical with respect to the center thereof, with the retaining juts 8b in pairs provided on the respective sides of the contact plate terminal 8' adjoining thereto, and the rotation preventive jut 8c at the other side, while the horn base 1 has the stoppers 1f for stopping the retaining juts 8b, and the notched groove 1g for engaging the rotation preventive jut 8c, so that it is possible to prevent the contact plate terminal 8' from being moved and rotated when connecting the harness terminal 25 to the contact plate terminal 8', thereby achieving enhancement in such connection work as described.

What is claimed is:

1. An airbag device comprising an airbag cover for housing an airbag folded substantially at the central part of a steering wheel, and electrical equipment disposed at a recessed part of the airbag cover, wherein a backside of the recessed part of the airbag cover is covered with a fixed end portion of a tubular tether belt for constraining a distance up to which the airbag undergoes inflation and expansion, and a harness or terminal connectable thereto is inserted into a harness hole provided in the recessed part and a harness insertion hole provided at the fixed end portion, the harness or the terminal connectable thereto being connected to an electrode member of the electrical equipment, the electrical equipment comprising a horn switch having a base inserted in the recessed part of the airbag cover,
a terminal structure,
a slidable member at a front side facing to an occupant side,
a conductive spring plate coupled to the slidable member and movable against the action of a resilient structure when the slidable member is pressed, and
a contact plate clamped in the horn base, said plate being electrically connected to the harness and the spring plate,
whereby the horn switch is closed by contacting the spring plate with the terminal structure, thereby sounding a horn.

2. An airbag device comprising an airbag cover for housing an airbag folded substantially at the central part of a steering wheel, and electrical equipment disposed at a recessed part of the airbag cover, wherein a backside of the recessed part of the airbag cover is covered with a fixed end portion of a tubular tether belt for constraining a distance up to which the airbag undergoes inflation and expansion, and a harness or terminal connectable thereto is inserted into a harness hole provided in the recessed part and a harness insertion hole provided at the fixed end portion, the harness or the terminal connectable thereto being connected to an electrode member of the electrical equipment, wherein the electrical equipment is a horn switching device, and is fixed substantially at a same position with an attachment bolt, said bolt being conductive and operative with the harness to establish a closed circuit for operating said electrical equipment, even after expansion of the airbag.

3. The airbag device according to claim 2, wherein the horn switching device comprises a horn base inserted in the recessed part of the airbag cover, a slidable member at a front side facing to an occupant side,
a butting member movable against the action of an energizing means by pressing down the slidable member, and
a contact plate clamped in the horn base by the energizing means, directly or indirectly connected to the harness, and electrically connectable to the energizing means and the butting member,
a short-circuit being provided by butting the butting member against the attachment bolt directly or indirectly thereby sounding a horn.

4. The airbag device according to claim 3, wherein the contact plate is provided with the terminal connected to the harness inserted through the harness hole and the harness insertion hole.

5. The airbag device according to claim 4, wherein the contact plate is provided with the terminal and retaining juts provided on both adjacent sides of the terminal at one side on an outer circumference thereof, and a rotation preventive jut at the other side symmetrical with respect to the center thereof, while the horn base has stoppers for stopping the retaining juts, respectively, and a notched groove for engaging the rotation preventive jut.

6. The airbag device according to claim 5, wherein the contact plate is fitted between a fitting part erected along an inner circumference thereof, on the horn base, and a rotation stopper erected along an outer circumference thereof, on the horn base.

* * * * *